Figure 1:
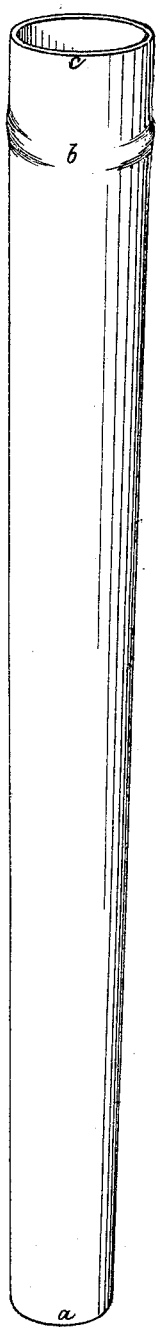

JAMES R. BIRD.
Improvement in Vulcanized Rubber-Tubes for Grain-Drills, &c.

No. 114,394.   Patented May 2, 1871.

United States Patent Office.

JAMES R. BIRD, OF BROOKLYN, NEW YORK, ASSIGNOR TO THE NEW YORK RUBBER COMPANY, OF NEW YORK CITY.

Letters Patent No. 114,394, dated May 2, 1871.

IMPROVEMENT IN VULCANIZED-RUBBER TUBES FOR GRAIN-DRILLS, &c.

The Schedule referred to in these Letters Patent and making part of the same.

*To whom it may concern:*

Be it known that I, JAMES R. BIRD, of Brooklyn, in the county of Kings and State of New York, have invented certain new and useful Improvements in Vulcanized India-Rubber Tubing, of which the following is a specification.

The vulcanized India-rubber tubing to which my invention relates is designed for use in any case where a conducting-tube is required, that shall be light, flexible, cheap, and easily attached to or detached from the apparatus, machine, or other device with which it is to be connected when in use.

An instance in which my improved tubing is of value is in grain-drills, so called, or seed-planters which employ flexible tubes, conducting from the grain-box to the furrow the grain which is to be planted.

A vulcanized India-rubber tube for this purpose, if made elastic throughout and of a compound stiff enough to keep its shape, would soon become hard and brittle and therefore unfit for use. The stiff material made of rubber cloth would not possess sufficient elasticity to allow it to be drawn over and clasp the projecting wooden or metal tube on the grain-box tightly enough to hold in place without other fastening, so that it would require to be tacked or nailed to the box or wooden tube, or to be tied to it and fastened in place by wire.

In practice, this has heretofore been the case. The tubes have been made of rubber cloth, fastened to the grain-box in the manner stated. The manufacturers of the drills have been compelled to put the tubes in place before sending out their machines from the factory, and the result is that the tubes, being firmly fastened in place and not removable, often become hard, weather-worn, and almost worthless in one season's wear, and frequently they are thus affected before the drill is sold.

The objections thus stated to the use of tubes of rubber cloth or stiff compound with grain-drills apply with equal force to other cases in which such conducting-tubes are needed and employed.

On the other hand, if the tubes were made of purer rubber, or of a better compound, they would, while possessing elasticity, flatten too easily and be too high in price.

My object, therefore, is to produce a conducting-tube for use with grain-drills and for other purposes which shall have the requisite elasticity at the point where it is to fit over and be connected with the grain-box or other device, while its remaining length or portion shall be of greater stiffness and less yielding; to this end, My invention consists of a vulcanized India-rubber tube for grain-drills and other purposes, having its body formed of rubber cloth, or of a stiff and comparatively inelastic compound of India rubber, and one or both of its ends composed of an elastic compound, the two being united by vulcanization, substantially as hereinafter described.

My invention will be readily understood by reference to the accompanying drawing, in which—

Figure 1 is a perspective view.

Figure 2:
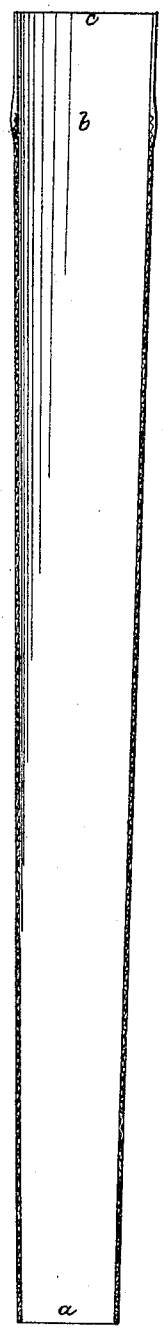

Figure 2, a longitudinal vertical section of a vulcanized India-rubber tube made in accordance with my invention, and shaped with special reference to its use with the grain-box of a drill.

The tube is slightly tapering, with its smallest diameter at the bottom. The greater portion of the body of the tube is made of canvas, coated on the inside and outside with rubber, this part of the tube extending from *a* to *b*.

The upper end, or that end which is stretched over the spout or tube of the grain-box, is formed of rubber compound sufficiently pure to possess all the elasticity required in order to allow it to be stretched over the spout, and to cause it to clasp the same firmly and tightly. This elastic portion extends from *b* to *c*, and is of any suitable length.

The parts *a b* and *b c* of the tube are placed together while the rubber is in the green or plastic state, and the two are then united and made into one tube by the process of vulcanization. In lieu of the rubber cloth any other suitable stiff vulcanizable compound may be used.

The tube thus made can be used to great advantage. When its services are not required it can be kept in the grain-box of the drill, away from all risk of being damaged by the elements; and when it is needed for use it can be fitted to the spout, where it will hold by its inherent elasticity, or can be tied for greater security, if preferred.

I have described the tube with special reference to its use with a grain-drill; but it is manifest that it can be used with any machine or device which requires the use of a conducting-tube of this character. It is also apparent that the shape of the tube may be varied greatly without departure from the spirit of my invention; and that, if required, both ends of the tube may be made elastic instead of one, the main portion of the tube remaining comparatively stiff and inelastic, as before.

What I claim, therefore, and desire to secure by Letters Patent, is—

1. A vulcanized India-rubber tube whose body is made of a comparatively stiff and inelastic compound of India rubber, with one or both ends formed of a distinctively elastic compound, the two being united by vulcanization, substantially as shown and described.

2. A vulcanized India-rubber tube for grain-drills and other purposes, having its body composed of canvas or equivalent textile fabric, coated internally and externally with rubber, and its upper end, or that end which is applied and secured to the drill, of an elastic compound of India rubber, the two being put together in the green or plastic state and then united by the process of vulcanizing, as shown and set forth.

In testimony whereof I have signed my name to this specification before two subscribing witnesses.

JAMES R. BIRD.

Witnesses:
  A. A. ALVORD,
  R. A. PIPER.